Patented Dec. 9, 1941

2,265,939

UNITED STATES PATENT OFFICE 2,265,939

AZEOTROPIC DISTILLATION

Edmund Field, Wilmington, Del., assignor to E. I. du Pont de Nemours & Company, Wilmington, Del., a corporation of Delaware No Drawing. Application May 3, 1940, Serial No. 333,112

9 Claims. (Cl. 202—42)

This invention relates to a method for separating substances which form binaries or azeotropes such that separation cannot be achieved efficiently by simple fractional distillation. More particularly, this invention relates to the separation of phenol from its mixture with cyclohexanone or cyclohexanol or both.

It is an object of this invention to provide a method for separating substances which form binaries or azeotropes whose separation by crystallization or fractional distillation is difficult or impractical. It is a further object of this invention to provide a method for separating phenol from cyclohexanone or cyclohexanol or mixtures of both. Other objects and advantages of the invention will be apparent from the following specification.

According to the present invention, phenol is removed from a mixture containing phenol and a substance or substances which form binaries or azeotropes with phenol by adding a compound, containing at least two alcoholic hydroxyl groups attached to saturated carbon atoms, to the phenol-containing mixture and distilling. An alcoholic compound of this general type, I have found, breaks down the phenol-containing azeotrope and permits the separation of phenol by distillation at approximately its normal boiling point. Thus, cyclohexanone forms an azeotrope with phenol, having a boiling point of 184.5° C. at 1 atmosphere (and having a composition of about 72% phenol, practically independent of pressure) from which azeotrope pure phenol is difficult of separation. However, I have found that by the addition to the azeotrope of 1 to 2 moles of a compound containing at least two alcoholic hydroxyl groups attached to saturated carbon atoms, such as diethylene glycol, triethylene glycol and tetramethylene glycol, per mole of phenol, followed by distillation, an efficient separation of the phenol and cyclohexanone may be obtained.

Similarly, compounds of the type described can be utilized according to this invention for breaking down phenol-containing azeotropes and separating phenol from other substances with which it forms azeotropic mixtures, for example, cyclohexanol.

Thus, although the compounds which may be used for the separation processes of this invention have previously been defined broadly as those compounds containing at least two alcoholic hydroxyl groups attached to saturated carbon atoms, this definition is intended to include:

All glycols, e. g., ethylene glycol, trimethylene glycol, tetramethylene glycol, 1,4-pentanediol, 1,3- and 1,4-cyclohexanediol and the like; polyglycols and other glycols containing one or more ether linkages in the carbon chain, e. g. diethylene glycol, triethylene glycol and the like; and compounds with three or more hydroxyl groups, e. g., glycerol, 1,3,5-cyclohexanetriol, 1,3,5,7-octanetetrol and the like.

In practicing this invention with ethylene glycol as the hydroxyl-containing substance, as well as when using other alcoholic compounds containing hydroxyl groups attached to adjacent carbon atoms, it has been found that such substances tend to react with cyclohexanone to form cyclic ketals.

The azeotrope between phenol and the ketone is nevertheless broken down. When ethylene glycol is usd the ketal will first distill with water and cyclohexanone, followed by nearly pure phenol. The cyclohexanone and glycol are then recovered from the ketal by hydrolysis. If there is no ketone in the original mixture, there will, of course, be no ketal formation and no hydrolysis step is required.

In order to avoid ketal formation and the concomitant hydrolysis step in the separation of ketones and phenol, we prefer to employ, for breaking the azeotrope, glycols with hydroxyl groups attached to non-adjacent carbon atoms. For example, when a compound such as diethylene glycol is added to a mixture of cyclohexanone, cyclohexanol and phenol. The ketone and alcohol can be almost quantitatively distilled away from the phenol-glycol residue after which the phenol is recovered at higher temperatures.

Although the process of this invention may, perhaps most advantageously, be practiced in a cyclic or continuous manner, for brevity in discussion my description is restricted to employing this invention in a batch operation. The phenol-containing azeotrope, after the addition of alcoholic compound, is subjected to distillation preferably at a reduced pressure of, say, 50 mm. The use of reduced pressure is preferred so that lower temperatures and any possible glycol or alcoholic compound decomposition may be avoided. In the case of an azeotropic mixture of cyclohexanone and phenol, about 50 to 70% of the cyclohexanone first distills off, followed by 60 to 70% of the phenol, leaving the alcoholic compound with part of the ketone and phenol. A new batch of fresh azeotrope may then be added and the distillation repeated.

Mixtures of cyclohexanol and phenol which form an azeotropic mixture similar to that of phenol and cyclohexanone may also be separated following the process of this invention. Furthermore, any mixture of cyclohexanol, cyclohexanone, and phenol can be separated according to this invention by the addition of an alcoholic compound, such as a glycol of the type described, followed by distillation, preferably at reduced pressure. Generally speaking, reduced pressures of the order of 10 to 300 mm. are satisfactory with 50–100 mm. preferred. Lower pressure ranges give more efficient ketone removal, after which pressure can be raised.

Cyclohexanol and cyclohexanone do not form binaries with each other, hence any excess of these materials, over the quantity joined with phenol as an azeotrope, can be first distilled out from mixtures of these materials as pure substances. The higher the ratio of glycol to phenol, the more efficient is the separation. For example, if the molecular ratio of glycol to phenol is 1 to 1, about 50% of the phenol-cyclohexanone azeotrope is broken down. At 2 to 1, 65% of recovery is obtained and at 15 to 1, 84% recovery results. The preferred ratio of glycol to phenol, expressed on a molar basis is in the range of 1½ to 2 moles glycol per mole of phenol.

The following examples will illustrate, without limiting, the scope of the invention.

Example 1

Into the pot of a closed, packed, jacketed and heated fractionation column there was introduced a mixture of 47.6% by weight phenol, 27.4% cyclohexanone, 0.2% cyclohexanol, 9.5% water and 15.3% hydrocarbon and condensation products (this mixture resulting from vapor phase dehydrogenation of cyclohexanol and cyclohexanone). To this mixture there was added 1.5 moles of diethylene glycol per mole of phenol present. Distillation of the resulting mixture was then carried out at 1 atmosphere pressure to remove the water and hydrocarbon impurities as foreshots, which come off at a head temperature below 96° C.

After removal of the foreshots, the pressure was adjusted at 50 mm. and distillation continued with a reflux of 5 to 1. At first a mixture of cyclohexanone and water distills but as the distillation proceeds almost pure cyclohexanone comes over as a distillate. Thereafter cyclohexanol distills followed by phenol containing about 10% cyclohexanone. When approximately 80% of the original phenol has distilled, diethylene glycol appears and continues in increasing amounts until the phenol has all been distilled. Thereafter diethylene glycol and high-boiling polymers distill as the final product.

In preferred practice according to this invention the distillation is carried only to the point where diethylene glycol begins to distill. At this point, in a batch operation, the distillation is stopped and the remaining liquid in the still pot may be augmented by further mixtures of phenol, cyclohexanol and cyclohexanone for further batch separation processes.

The distillation cuts previously referred to containing approximately 90% pure phenol are then redistilled at a pressure of about 50 mm. and with an 8 to 1 reflux. In the resulting distillate the phenol cuts produce phenol analyzing 99+%. By the use of a more efficient fractionating column for the original distillation, pure phenol of a 99+% analysis may be directly obtained, eliminating the necessity of redistillation.

Example 2

Into the pot of a fractionation column such as described in Example 1 there was introduced a mixture of 107.2 grams total weight containing about 71% phenol and 29% cyclohexanone. To this mixture there was added 103.5 grams trimethylene glycol. Distillation of the resulting mixture was then carried out at 50 mm. pressure at a reflux ratio of 5 to 1.

From 60.8° to 96.2° C., an 18.4 gram cut was obtained which analyzed 96% cyclohexanone and 0.7% phenol. The temperature then rose sharply to 104.8° C. and 53.6 grams distillate was recovered up to a temperature of 106.2° C. This distillation cut analyzed 85.8% phenol and 9.8% cyclohexanone.

Example 3

In a manner similar to that described in Examples 1 and 2, into the pot of a fractionation column such as described in Example 1 there was introduced 125.0 grams of a solution containing 71% phenol and 29% cyclohexanone. To this mixture there was added 115.4 grams of tetramethylene glycol. Distillation of the resulting mixture was then carried on at 50 mm. pressure and with a reflux ratio of 5 to 1.

The progress of this distillation and the distillation cuts which were recovered are shown in the following summary:

| Cut | Boiling range | Distillate | Composition of distillate |
|---|---|---|---|
| | Degrees | Grams | |
| 1 | 55.5– 71.8 | 9.5 | 0.7% phenol, 87.1% cyclohexanone. |
| 2 | 71.8–103.5 | 13.8 | 0.6% phenol, 94.8% cyclohexanone. |
| 3 | 103.5–104.8 | 15.8 | 77.4% phenol, 17.0% cyclohexanone. |
| 4 | 104.8–105.0 | 27.0 | 90.8% phenol, 7.4% cyclohexanone. |
| 5 | 105.0–113.2 | 51.9 | 87.3% phenol, 11.8% cyclohexanone. |

After completion of this distillation more of the binary azeotrope mixture of phenol and cyclohexanone was added and the distillation was continued.

Example 4

As described in Example 1, 158.6 grams of a mixture of 71% phenol and 29% cyclohexanone was introduced into a fractionation column such as described in Example 1. To this mixture there was added 147.6 grams of ethylene glycol and distillation of the resulting mixture was carried out at 50 mm. pressure and with a 5 to 1 reflux ratio.

The first distillation cuts were found to contain water, cyclohexanone and the cyclic ketal of cyclohexanone and glycol. A cut of boiling range from 92.2 to 103.9° C. was removed weighing 27.3 grams and analyzing 80.2% phenol with 9.9% cyclohexanone. Redistillation of this cut as described in Example 1 gave a phenol analyzing 99+%.

Various changes may be made in the details and preferred embodiments of this invention without departing therefrom or sacrificing any of the advantages thereof.

I claim:

1. A method of separating phenol from its mixture with cyclohexanone which comprises adding to such mixture a compound containing at least two alcoholic hydroxyl groups attached to saturated carbon atoms and separating phenol from the resultant mixture by distillation.

2. A method of separating phenol from its mixture with cyclohexanone which comprises adding to such mixture a compound containing at least two alcoholic hydroxyl groups attached to non-adjacent saturated carbon atoms, and separating phenol from the resultant mixture by distillation.

3. A method of separating phenol from its mixture with cyclohexanone which comprises adding to such mixture, per mole of phenol, 1 to 2 moles of a compound containing at least two alcoholic hydroxyl groups attached to saturated carbon atoms and separating phenol from the resultant mixture by distillation.

4. A method of separating phenol from its mixture with cyclohexanone which comprises adding to such mixture, per mole of phenol, 1 to 2 moles of a glycol containing hydroxyl groups attached to non-adjacent carbon atoms and separating phenol from the resultant mixture by distillation.

5. A method of separating phenol from its mixture with cyclohexanone which comprises adding to such mixture, per mole of phenol, 1 to 2 moles of diethylene glycol and separating phenol from the resultant mixture by distillation.

6. A method for separating phenol from a mixture containing phenol and a substance selected from the group consisting of cyclohexanone and cyclohexanol which comprises adding to such mixture a compound containing at least two alcoholic hydroxyl groups attached to saturated carbon atoms and separating phenol from the resultant mixture by distillation.

7. A method for separating phenol from its mixture with cyclohexanol which comprises adding to such a mixture a compound containing at least two alcoholic hydroxyl groups attached to saturated carbon atoms and separating phenol from the resultant mixture by distillation.

8. A method for separating phenol from a mixture containing phenol and a substance selected from the group consisting of cyclohexanone and cyclohexanol which comprises adding to such mixture diethylene glycol and separating phenol from the resultant mixture by distillation.

9. A method for separating phenol from its mixture with cyclohexanol which comprises adding to such a mixture diethylene glycol and separating phenol from the resultant mixture by distillation.

EDMUND FIELD.